June 7, 1966  J. DAUGHERTY  3,254,567
MACHINE TOOL POWER DRAWBOLT
Filed Jan. 16, 1964  5 Sheets-Sheet 2
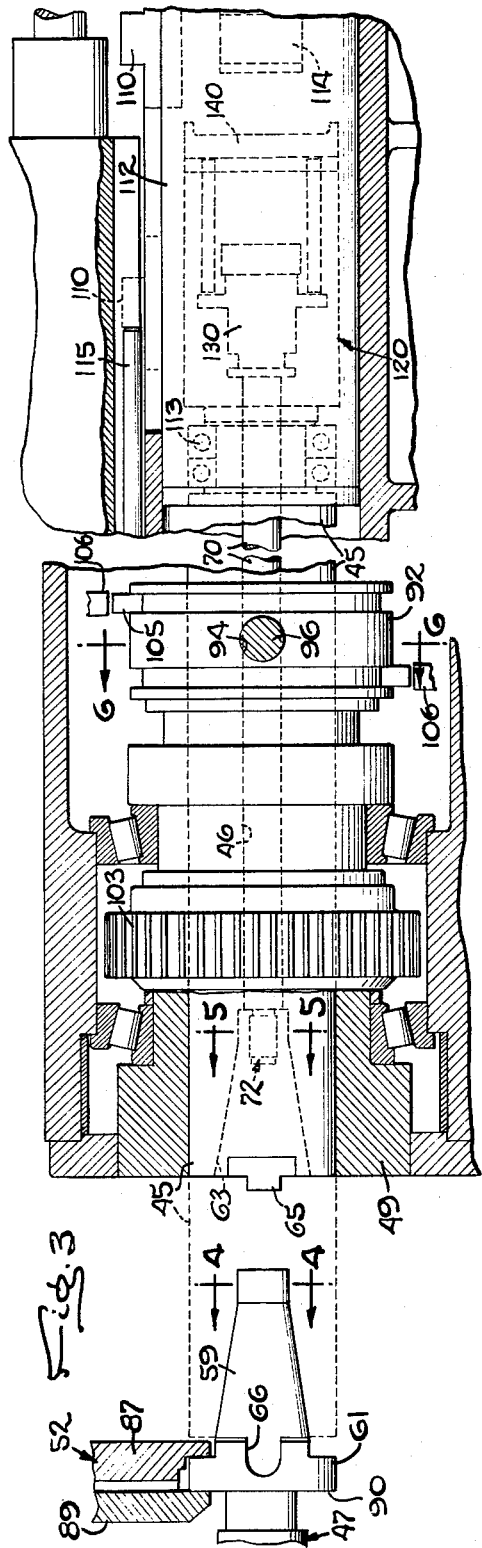
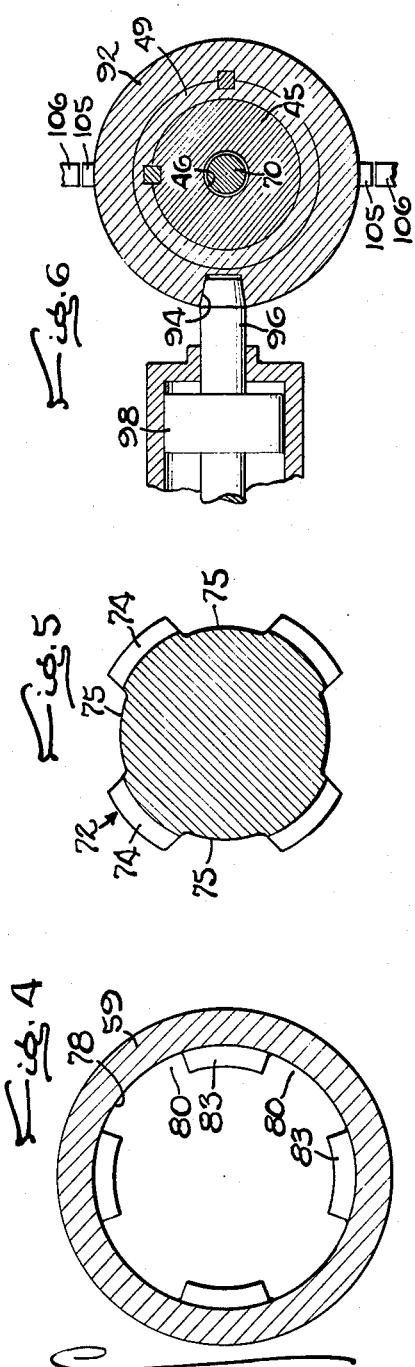
INVENTOR
Jesse Daugherty
Wolfe, Hubbard, Voit & Osann
ATTORNEY

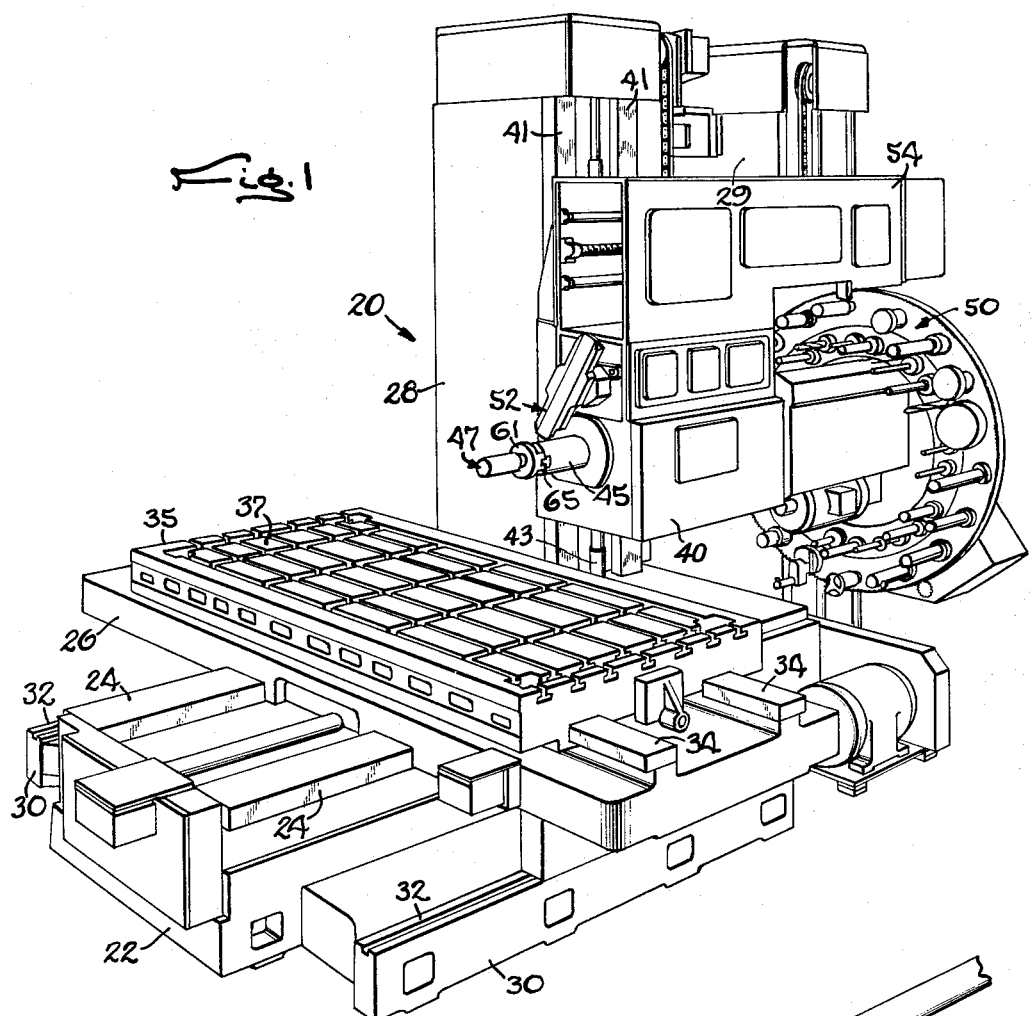

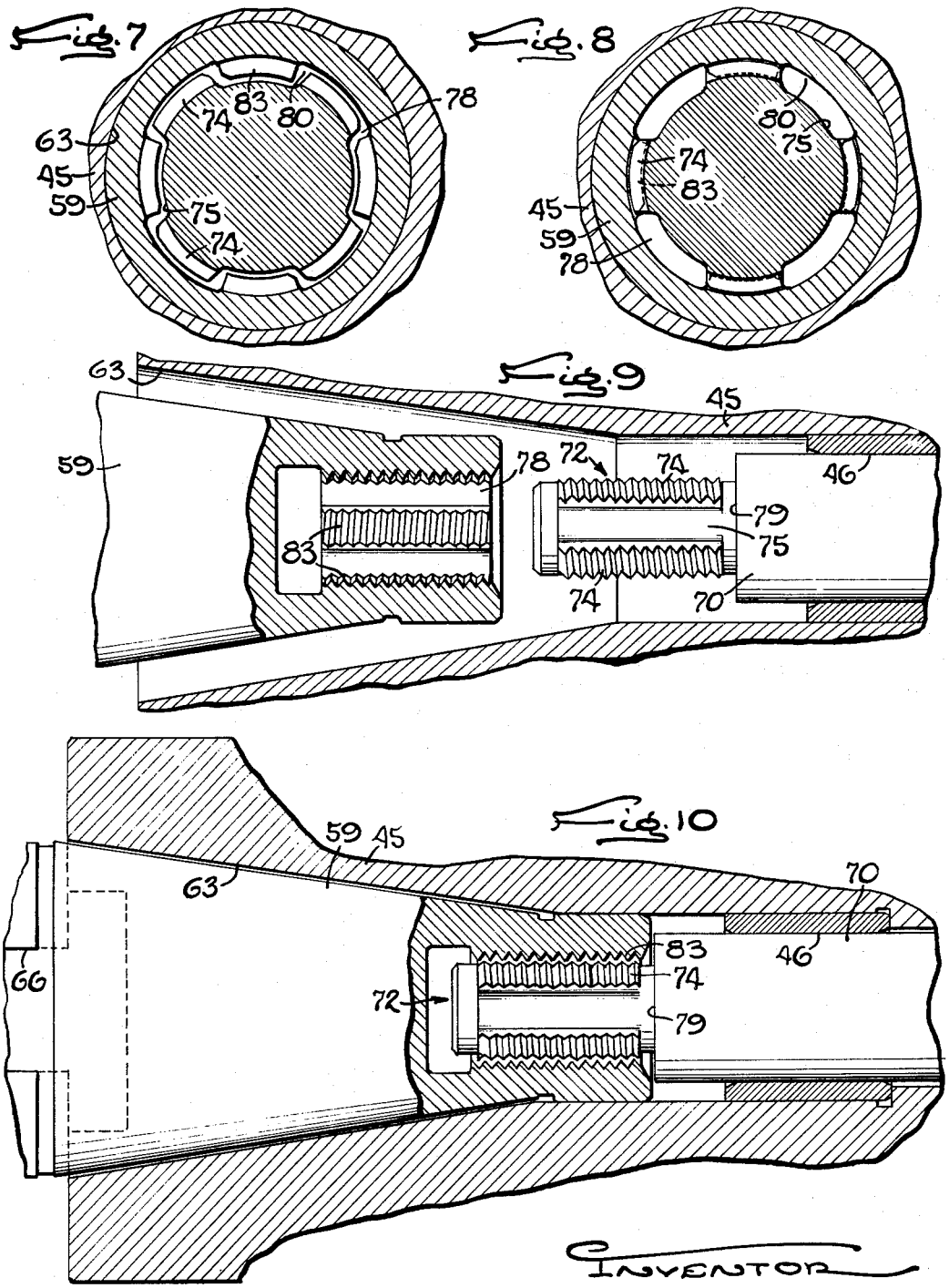

June 7, 1966  J. DAUGHERTY  3,254,567
MACHINE TOOL POWER DRAWBOLT
Filed Jan. 16, 1964  5 Sheets-Sheet 4
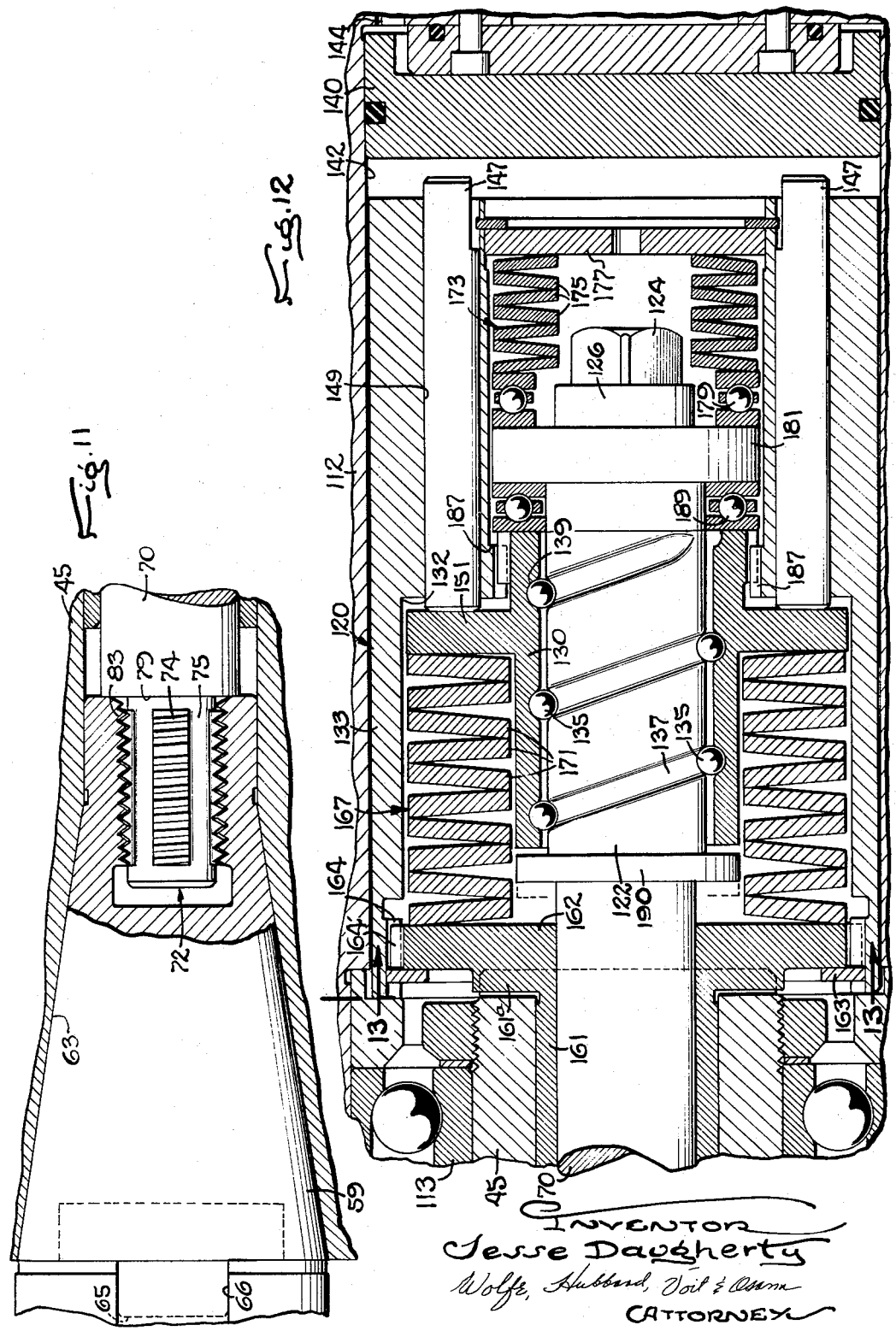

June 7, 1966   J. DAUGHERTY   3,254,567
MACHINE TOOL POWER DRAWBOLT
Filed Jan. 16, 1964   5 Sheets-Sheet 5
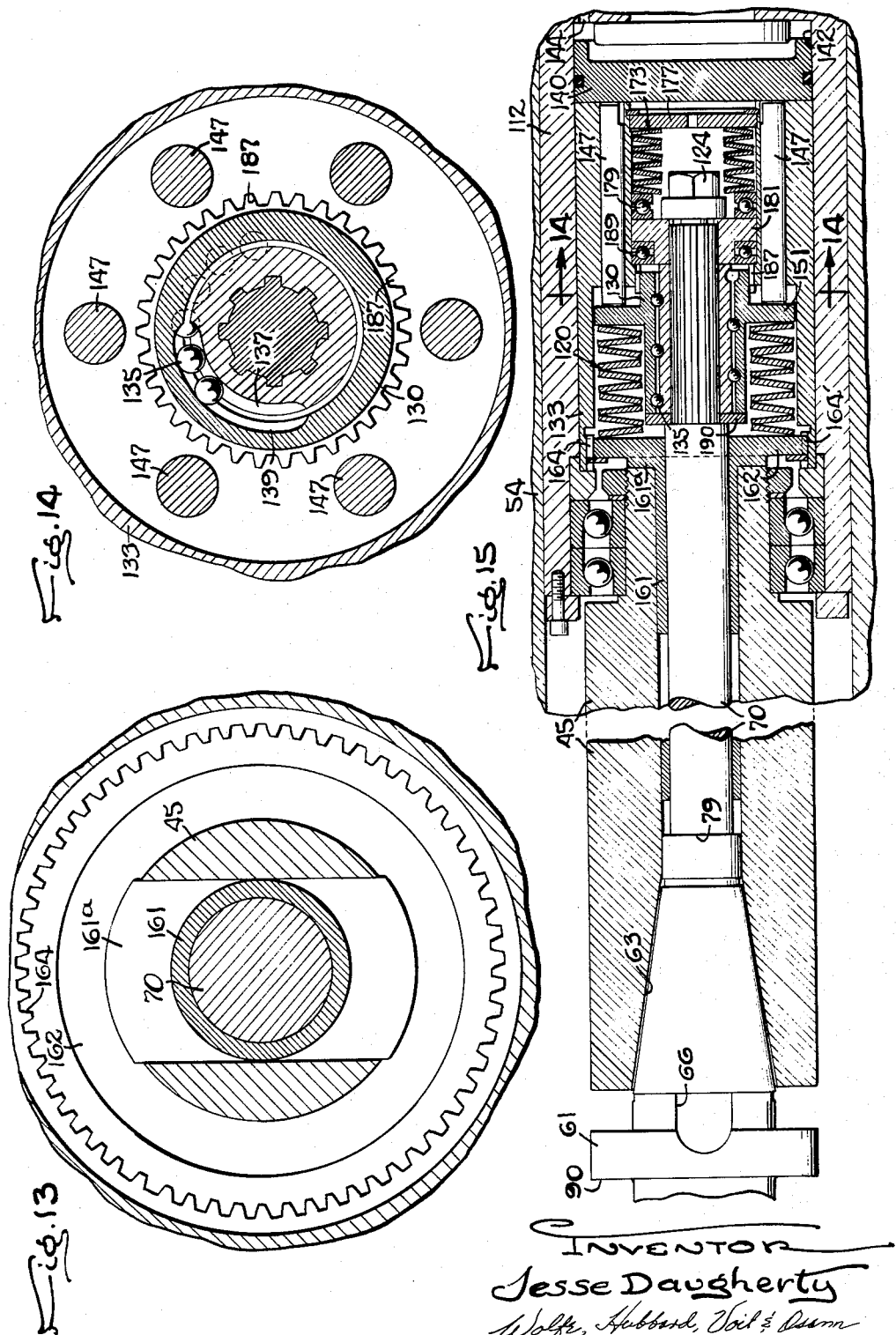
INVENTOR
Jesse Daugherty
Wolfe, Hubbard, Voit & Osann
ATTORNEYS United States Patent Office 3,254,567
Patented June 7, 1966

3,254,567
MACHINE TOOL POWER DRAWBOLT
Jesse Daugherty, Fond du Lac, Wis., assignor to Giddings & Lewis Machine Tool Company, Fond du Lac, Wis., a corporation of Wisconsin
Filed Jan. 16, 1964, Ser. No. 338,108
15 Claims. (Cl. 90—11)

The present invention relates to machine tools and more particularly to power drawbolts for securing work tools in the spindles of machine tools.

A power drawbolt constructed in accordance with the present invention is shown for illustrative purposes in the spindle of a horizontal boring, drilling and milling machine. One of the objects of the present invention, however, is to provide a power drawbolt which is virtually universally applicable wherever a power drawbolt mechanism is embodied in a machine tool spindle. The power drawbolt of the present invention, therefore, is not limited to use in machines of the type shown but, on the contrary, is usable in a wide variety of different machine tools. The machine tool illustrated, however, encounters more severe problems with power drawbolt mechanisms than are found with some other type of machine tools. It is helpful for this reason to explain the power drawbolt mechanism of the invention in its application to horizontal boring and drilling machines. Moreover, the machine tool illustrated is equipped with automatic tool changing apparatus which also raises special problems with power drawbolt mechanisms.

Heretofore, machine tools having automatic tool changing in most cases have not used power drawbolts because such have been found to interfere with the tool changing operations. The conventional axially translatable threaded drawbolt, for example, is slow and uncertain in operation in such applications.

It is one object of the invention, in accordance with the above, to provide a tool engaging power drawbolt which is compatible with automatic tool changing equipment, and unusually fast in securing the work tool to, and releasing the same from, the machine spindle.

It is another object, related to the above, to provide a device which rapidly effects decisive engagement of tool and spindle, and likewise rapidly ejects the tool, so secured, when the operation to be performed with it is completed, or for other reasons as may occur.

A further object of the invention is to provide a device as herein characterized which may be operable by automatic machine control and requires no manual intervention.

It is still another object of the present invention to provide a drawbolt arrangement which provides the secure grip of threaded engagement without the tendency, inherent in many prior known devices, toward time loss and thread damage as the revolving drawbolt seeks proper engagement with the threads in the work tool engagement process. And a further and related objective is the provision for rapid prealignment of the work tool and complementary drawbolt elements to provide immediate engagement every time.

The preceding objects and advantages, as well as numerous others will become apparent from the following detailed description of a preferred embodiment of the present invention taken in conjunction with the appended drawings, wherein:

FIGURE 1 is a perspective of an exemplary horizontal boring, drilling and milling machine equipped with an automatic tool changer and embodying the present invention in its preferred form;

FIG. 2 is an enlarged perspective of an exemplary cutting tool adapted for use with the machine of FIGURE 1 and showing a portion of the drawbolt mechanism constructed in accordance with the invention herein;

FIG. 3 is a fragmentary sectional view of the headstock of the machine of FIGURE 1, illustrating a portion of the drawbolt mechanism;

FIG. 4 is a sectional view taken along line 4—4 of FIG. 3, illustrating the bore in the tool holder for receiving the power drawbolt;

FIG. 5 is a sectional view taken along the 5—5 of FIG. 3, illustrating the configuration of the power drawbolt;

FIG. 6 is a fragmentary sectional view taken along line 6—6 of FIG. 3 to illustrate the shot pin for locating the spindle angularly for a tool change operation;

FIGS. 7 and 8 are sectional views taken transverse to the axis of the drawbolt and tool, when the two are mated as in FIG. 10, illustrating the disengaged and engaged thread positions, respectively;

FIG. 9 is an enlarged sectional view with some parts in elevation, illustrating the respective positions of the drawbolt and cutting tool prior to the insertion of the threaded portion of the drawbolt into the tool socket;

FIG. 10 is a view similar to FIG. 9 illustrating the cutting tool with the drawbolt end portion inserted in the tool socket;

FIG. 11 is a view similar to FIGS. 9 and 10, illustrating the same relative axial position of the parts as in FIG. 10, but with the drawbolt rotated through an angle of 45° to engage the threads in the tool socket;

FIG. 12 is an enlarged sectional elevation of a portion of the drawbolt actuating mechanism constructed in accordance with the invention;

FIG. 13 is a sectional view taken along lines 13—13 of FIG. 12;

FIG. 14 is a sectional view taken along lines 14—14 of FIG. 15; and

FIG. 15 is a side elevation, partially sectioned and fragmented of the drawbolt and associated mechanism for actuating the same, showing the actuating mechanism in condition preparatory to ejecting the tool.

While the invention will be described in connection with a particular preferred embodiment, it will be understood that the invention is not limited to that embodiment, but is intended to encompass all alternatives, modifications and equivalents as may be properly included with in the spirit and scope of the invention as defined by the appended claims.

With reference now to the drawings, and particularly to FIG. 1, an exemplary horizontal boring, drilling and milling machine of the type with which the present invention has particular, though not exclusive utility, is illustrated and indicated generally by the numeral 20. As shown, this exemplary machine comprises a bed 22 having ways 24 longitudinally disposed thereon which support a saddle 26 for movement toward and away from a vertical column 28 which forms part of the machine. Outboard supports 30 are provided on either side of the bed 22, offering ways 32 providing lateral support for the saddle 26. The saddle 26 is likewise formed with ways 34 which run transversely to the ways 24, and carry a table 35 adapted to support a work piece (not shown) on the surface 37 thereof.

A headstock 40 is secured to the vertical column 28 on ways 41, and a power elevating screw 43 is provided for positioning the headstock 40 vertically on the ways 41. A spindle 45 is both rotatably and translatably supported in the headstock 40 by a spindle sleeve 49 and is adapted to carry a work tool, such as the milling cutter 47, which is illustrated in detail in FIG. 2. In the present instance, the machine shown is equipped with automatic tool changing apparatus, and while the present invention is by no means limited to devices having such automatic equipment, the features of the present invention complement such automatic equipment, and therefore it will best serve the end of providing a clear understanding of the invention by noting briefly, exemplary tool changing apparatus and the structure comprising the same.

Still referring to FIGURE 1, a matrix, indicated generally by the numeral 50, is disposed at the rear of the headstock, where it is mounted on a vertical column 29. The matrix is adapted to carry a selection of cutting tools. The tools are individually transported to a tool change arm 52 by means of a shuttle carriage (not specifically shown) which operates in a protective housing 54 carried by the headstock and moves between the matrix 50 and a tool change arm 52. The tool change arm 52 is so constructed as to remove tools from the spindle area and replace them with a succeeding tool in a manner which will appear in greater detail hereinafter.

The safe, secure and rapid driving engagement of a particular tool in the spindle of a machine tool is a principal concern of this invention. It is typical of such machines to employ a variety of tools when working on a particular work piece mounted on the table. Exemplary of such tools is the milling head 47, illustrated in perspective in FIG. 2 and comprising a cutter portion 57 supported by a tool holder having a tapered mounting shank 59 and a radial flange 61 which, in the present instance, is advantageously employed by the automatic tool changing apparatus. A tapered mounting shank offers particular advantage for tool alignment with the axis of the spindle and enables greater cutting accuracy with the machine tool. The tapered shank 59 of the tool is received in a complementary tapered spindle socket 63 formed concentrically in the forward, free end of the spindle, and in order to provide a positive drive to the tool so mounted in the spindle, as well as to assist in proper tool alignment, a pair of drive keys, such as the one indicated at 65, protrude from the spindle about the periphery of the taper socket, and are adapted to engage complementary keyways 66 formed in the flanged portion 61 of the tool holder. Because of the need for accurate prealignment of the tool and spindle, such keys are preferably nonsymmetrically spaced radially so that the keys and keyways will become aligned in only one angular position of the tool relative to the spindle.

The tool holder itself is secured in the socket 63 so as to obtain the desired alignment of the shank of the tool holder with the spindle axis, and to prevent its coming loose and causing damage while being rotated at high speeds, by the spindle. To this end, a drawbolt 70 is provided, in accordance with the invention, centrally disposed in the spindle 45 in a longitudinal bore 46, and extending into the tapered socket 63 for engaging the work tool 47 during the use thereof by the machine. It is in keeping with the present invention that the drawbolt engagement is accomplished in a novel manner, securing to the user of a machine embodying the device the advantages of rapid engagement and disengagement of the tool while permitting relatively great holding power to be exerted on the tool to maintain the same in the tapered socket 63.

To this end, referring now to FIGS. 4 and 5 in particular, the forward threaded end 72 of the drawbolt 70 is divided by four longitudinal grooves 75 much like a tap is formed so as to provide a quadrified construction having four peripherally spaced threaded lands 74. In complementary fashion, the tool holder 47 is provided with an axially formed threaded bore or recess 78, seen in FIGS. 4 and 9–11. The bore 78 is divided by longitudinal grooves 80 complementary to the threaded lands 74 on the drawbolt, providing four spaced radially inwardly projecting lands 83. The pitch of the male threads on the drawbolt matches the pitch of the threads in the recess in the tool holder so that the drawbolt may be engaged therein. In the operation of the power drawbolt 70 it is inserted axially into the tool holder recess 79, being properly aligned for insertion when positioned as shown in FIG. 7, with the lands 74 on the drawbolt aligned with the grooves 80 in the walls of the recess 78. This drawbolt position is also shown in FIG. 10, so that a shoulder 79 (FIG. 9) abuts the end of the tool. One of the important features of the invention is the speed by which full locking engagement of the drawbolt can be obtained. It will be seen from FIGS. 7–10 that with the drawbolt 70 inserted fully into the socket 78 of the work tool 47 by direct axial translation; every thread is immediately engaged upon rotation of the drawbolt prior to drawing the tapered shank of the holder into full seating engagement with the tapered spindle socket. Thus the power drawbolt will be rotated through an angle no greater than 45° to fully and completely engage the drawbolt with the tool.

In order to permit rotation of the drawbolt relative to the tool, though the shoulder 79 thereof abuts the tool shank, the threads of each are machined to provide a small amount of axial play. Thus, rotation is possible without binding at the shoulder, or overstressing engaged thread segments. The absence of heavy thread loading also reduces friction and attendant thread wear during engagement and disengagement. The previously difficult task, therefore, of first picking up the female thread by the end of the power drawbolt, and thereafter rotating the drawbolt until it is fully screwed into the socket is simply and expediently eliminated. Further, with all of the threads fully engaged during tool ejection, the problem of stripping the end of the threads by exerting excessive force thereon is no longer encountered since all of the threads rather than one or two are engaged to absorb the axial forces on the tool and drawbolt.

The broad principles underlying the quadrifid threaded construction of the drawbolt have been applied in the construction of breech lock mechanisms of heavy cannon, and for this reason the present drawbolt may be referred to as a breech-lock drawbolt. It will be appreciated that quadrifid constructions have been chosen for purposes of exemplifying the invention only and it is contemplated that another suitable number of lands may be conveniently employed in the novel manner disclosed. The number of threaded lands, of course, will have a direct bearing on the number of degrees of rotation required to engage the tool, and some bearing on the axial forces which may be applied to the tool through the drawbolt.

In order to make the most beneficial use of the modified quadrifid thread principles and structures described above, it is preferred that the precise angular relationship between the socket 78 and the drawbolt end 72 be established virtually from the time the tool is picked from the matrix wheel 50 and introduced into the spindle socket 63. To this end, and further in keeping with the invention, means is provided for establishing the angular position of the tool 47, in the case of those machines employing automatic tool changers from the moment it is removed from the matrix where it is stored. In a like manner, the angular disposition of the spindle, and accordingly the drawbolt, is established by suitable positioning apparatus built into the machine so that when the tool 47 is initially received in the spindle socket their relative position is essentially that indicated by FIG. 7; i.e., the threaded portions 74 on the drawbolt are aligned with the grooves 80 of the socket, and likewise the threaded portions 83 are aligned with the grooves 75 on the drawbolt.

In further discussion of prealignment apparatus, it will be presumed that an automatic tool changer is being employed, for such equipment presents more difficult problems in prealignment of the work tool and spindle. It will be understood from a procedural standpoint that the following description is exemplary only and that, depending upon the particular machine used, prealignment may be attained in other ways without departing from the spirit of the invention.

As shown in FIGS. 1 and 3, the tool changer arm 52 grasps the flange portion 61 of the work tool 47, and holds the same rigidly while it swings the tool from the tool shuttle area to a position in axial alignment with the spindle 45. It will be seen that since the tool does not move when held by the tool changer arm, the angular position of the tool may be predetermined to be the same each time the tool is moved into axial alignment with the spindle. In assuming such alignment, the gripping portion of the tool change arm 52 is formed with a fixed member 87 and a pivotable gripping lever 89 which is capable of being forced with great pressure by the actuating mechanism against the forward face 90 of the flange 61. In this manner the flange 61 is held between the pivotable and fixed gripping members 89, 87 of the tool change arm to support the tool during the period of movement toward and away from the spindle.

Prior to insertion of the cutting tool, it is necessary to assure that the desired initial angular position of the spindle, and accordingly the drawbolt, has been achieved, and this is accomplished in accordance with the invention by the mechanism exemplified in FIG. 6. A ring 92 (FIG. 3) is mounted about the spindle sleeve 49 rigidly and in such a manner that the angular position of the ring 92 always relates directly to the angular position of the spindle 45. Such a relationship is advantageously used to preposition the spindle in the desired angular attitude. So as to permit determination of the proper spindle position through the position of the ring, the ring 92 is notched as at 94, and a shot pin 96 is provided, in this case being connected to a piston 98 for moving the shot pin 96 inwardly to engage the notch 94. The shot pin is used to engage the notch to locate and hold the spindle in the predetermined angular position necessary to achieve smooth engagement, and permit uninterrupted engagement of the drawbolt into the socket 78. The spindle itself is rotated by means of an existing drive transmission of any suitable construction indicated simply as box T through ring gear 103.

When a tool is being changed, the transmission is conditioned to provide slow rotating motion to the spindle to establish the desired angular position. In facilitating the smooth locking of the spindle in its tool receiving position, sensing mechanism is provided to signal the approach of the notch to the shot pin. Trip dogs 105 are disposed on the periphery of the ring 92 at an appropriate distance from the notch 94. While in the present instance they are shown as approximately 90° from the notch and approximately 180° from each other, it will be appreciated that this may be varied as desired. Proximity switches 106 of any suitable type are positioned on either side of the shot pin 96 at an appropriate peripheral distance therefrom and are adapted to be tripped by the dogs 105, thereby sending a signal to the control for the piston 98, which moves forward in response thereto to engage the notch 94, thereby accurately and positively locating the spindle in the predetermined angular position.

In order to minimize the necessary movement of the tool changing equipment, and to make optimum use of existing mechanism, the spindle is preferably extended from a pre-engagement retracted position, as viewed in FIG. 3, to a position as shown by the dotted lines in that figure where the tool shank 59 is loosely seated in the tapered socket 63. When this position is achieved, keys 65 are received in the keyways 66 and it will further be observed that the threaded end portion 72 of the drawbolt 70 is received in the socket 78.

Axial extension and retraction of the spindle is accomplished in any convenient manner and it would not further the purpose of the present description to present in detail an exemplary procedure for doing this. It will suffice, for the purpose of the present invention to note that the spindle is rotatably journaled in end-to-end fashion to a ram 112 by a bearing 113. The ram is supported within the headstock for translation by a hydraulic actuator 114. The axial position of the spindle is determined by an anvil 110 on the ram which is adapted to engage a gage rod 115 of a gage rod assembly which provides means for determining various axial positions of the spindle. The force of the hydraulic actuator 114 is stalled against the gage rod 115 and further spindle extension is immediately halted.

The condition of the machine is now such that the tool 47 is rather loosely supported (in the preferred case with about 1/64" clearance from full tight position) within the socket provided therefor in the spindle, and the drawbolt is fully extended into the socket 78, with the end 79 thereof abutting the tool and thus determining its position in the socket. It is an attribute of the invention that to lock the tool in place involves sequential operations: (1) rotating the drawbolt through a small angle, in the present instance approximately 45°, to secure full threaded engagement of the tool and drawbolt before (2) applying sufficient tension to the drawbolt to secure the shank 59 in the socket 63. This is accomplished, in accordance with the invention, automatically and in the exemplary embodiment disclosed hydromechanically in a manner which permits the entire apparatus to be conveniently disposed and controlled within the spindle and ram.

With particular reference to FIGS. 12 and 15, the present invention provides a spring-loaded, axially translatable antifriction ball screw arrangement connected to the drawbolt 70 and adapted to control the axial and angular position thereof about its axis. Recalling the function of the drawbolt as part of the invention, it will be remembered that both angular rotation and axial translation are required during its operation, and this is accomplished specifically by a screw assembly designated generally at 120. The screw assembly is of a generally familiar construction, designed to convert axial movement of one of its members to angular rotation of its associated member. The drawbolt 70 is fixed to the screw portion 122 of the assembly 120 by a splined connection through the center of the screw, and is secured by means of a nut 124 and washer 126 at the end. The nut portion 130 of the screw assembly 120 is positioned for limited axial translation in a cylindrical chamber 132 defined by the inner walls of a sleeve 133, rotatably disposed within the ram 112. The nut portion 130 and screw portion 122 are interengaged by means of a number of force transmitting balls 135 which ride in opposed helical races 137 and 139, formed on the screw and nut, respectively. Referring to FIG. 15, the assembly 120 is suitably contained in the forward end of the ram 112 and near the rear of the spindle. FIG. 3 represents the live spindle at the left and the ram 112 at the right with the power drive associated with the latter for moving the ram to extend and retract the spindle. The screw assembly 120 rotates with the spindle and the power drawbolt in the spindle, being supported for rotation on a flanged bushing 161 in the rear end of the spindle 45.

In operation of the power drawbolt, forces directed against the screw assembly result in the required drawbolt movement. Thus, forces causing axial movement of the nut 130 will result in the transmission of proportionate forces through the balls 135, to the screw for rotating the same, and accordingly the drawbolt 70 with it. Drawbolt operation is required either to release a tool in the spindle or to draw and latch a tool in the spindle. The requisite axial movement of the nut 130 to rotate the drawbolt in a direction which will release a tool in the spindle is satisfactorily obtained through use of fluid power, and since hydraulic oil is usually available for other machine operations, a hydraulically operated piston 140, mounted rearwardly of the assembly 120, and movable axially in cylinder 142, formed in the ram 112, exemplifies one excellent way of controlling the action of the screw assembly 120. When the spindle is stopped and it is desired, for example, to release a tool in the spindle, pressurized fluid connected through a suitable port 144 behind the piston 140 moves the same to the left, as viewed in FIG. 12, and against a number of push rods 147, six of which (see FIG. 14) are used in the present instance to transmit a balanced force axially to the nut 130. As will be seen, the push rods 147 are axially disposed in a circle about the screw assembly 120, and are slidable in bores 149, formed in the sleeve 133. In order to operate the screw, the ends of the rods 147 remote from the ends adjacent the piston 140 abut a drive flange 151, formed on the nut 130.

The assembly is shown in FIG. 12 with a tool locked in the spindle by the assembly, and the forward engaging end is seen in FIG. 11 with all of the threads being fully engaged and the shoulder 79 of the drawbolt abutting the tool shank. In order to release the tool using the disclosed mechanism, fluid pressure is provided to force a leftward movement of the piston 140, causing a leftward movement of the rods 147 against the drive flange 151. This initial movement of the piston serves to release tension in the drawbolt by overcoming the force of the spring assembly 167. Further application of this axially directed force to the drive flange is transmitted to the nut 130 and causes rotation of the screw 122 and thus the drawbolt 70 counterclockwise as viewed from the right in FIG. 12, to disengage the drawbolt threads from the threads in the socket.

Motion of the piston 140 to release the tool in the spindle loads the return spring assembly 167 comprising a series of relatively heavy Belleville washers 171 in operative engagement with the nut 130. It will also be observed that upon release of pressure fluid from behind the piston 140, the spring assembly 167 will move the nut 130 axially to rotate the screw 122 and thereby the power drawbolt in a clockwise direction to engage and latch a tool in the spindle.

It will be appreciated that the screw, and drawbolt connected thereto, will rotate as long as the nut 130 moves axially and the screw 122 is axially restrained. Since a short one-eighth turn is all that is needed in order to fully engage or disengage the exemplary quadrifid threaded portion of the present drawbolt, with the tool, the extent of rotation of the screw may be suitably governed by appropriately limiting the axial motion of the nut. As indicated, effective drawbolt operation entails both rotation and translation thereof to a limited extent relative to the spindle, while providing for rotation thereof with the spindle when the same is rotated. Accordingly, the invention provides suitable support for the drawbolt and associated actuating mechanism, as seen in FIGS. 12 and 13. In accomplishing this the bushing 161, provided in the right-hand end of the spindle bore 46, supports the drawbolt for both axial and rotary motion. As seen in FIG. 13, it is provided with a flanged end 162 which is drivingly locked to the bushing body by a radial key and keyway joint 161a. The flange is adapted to support the assembly 120 for direct rotary motion with the spindle. To that end, the flange is received in bore 132 of the sleeve 133 and is retained therein by an annular lock ring 163. The bore 132 is provided with internal splines 164 engaged in external splines 164' on the outer edge of the bushing 161 to provide a drive connection therebetween.

With the spindle secured by the shot pin from rotation, FIGS. 9 and 15 illustrate the apparatus in condition to accept a work tool, which has been placed in axial alignment with the spindle by the tool change arm 52. In FIG. 9, the spindle 45 is being extended to encompass the tapered shank 59 of the exemplary tool 47. The drawbolt end and tapped bore in the tool are oriented in the manner described for this operation as shown in FIG. 7 so that the quadrifid drawbolt end freely enters the quadrifid tapped bore to reach the position of FIG. 10. As seen in FIG. 3, the spindle is moved forward to a predetermined tool change position where the anvil 110 engages the limit rod 115. At this point, there is preferably approximately 1/64" clearance between the tapered shank of the tool and the spindle as determined with the shoulder 79 on the drawbolt and the end of the tool shank abutting and the drawbolt extended to provide the clearance. As seen in FIG. 15, the piston 140 of the drawbolt actuating mechanism having been previously actuated to release a prior tool, is under fluid pressure in its left-hand position against the rods 147. In this position of the piston 140 the drawbolt threads are properly oriented for insertion in the tapped bore in the tool. The tool itself is likewise preoriented to engage the drive keys 65 in the keyways 66.

Insofar as the drawbolt is concerned, when the actuating piston 140 reaches the limit of its extension in the cylinder 142, as shown in FIG. 15, the screw assembly 120 has been fully rotated to the limit of its operative movement. The left-hand position of the nut 130 is determined by the power transmitting rods 147. The left-hand position of the screw 122 is determined under the urging of a second Belleville washer spring assembly 173 comprising a series of relatively light Belleville spring washers 175. These washers 175 are axially restrained between a retainer plate 177 fixed to the sleeve 133 and a thrust bearing 179 forced against a flange 181 on the end of the power drawbolt. In the position of the actuating mechanism shown in FIG. 15, the power drawbolt is urged to the left by the Belleville spring assembly 173 to a position fixed by the ends of splines 187 in the sleeve 133 which serve as a stop against movement of a thrust washer 189. This thrust washer 189 is between the splines 187 and the flange 181 on the power drawbolt effectively stopping movement of the drawbolt to the left and thereby determining the position of the screw with the drawbolt fully extended. With the position of the screw and the nut of the assembly being both determined by stops, both the axial and rotational condition of the drawbolt is likewise established.

Actuation of the drawbolt to engage the tool is accomplished by the release of fluid pressure on the piston 140, thereby allowing the relatively heavy Belleville spring assembly 167 to supply motive power to move the nut 130 axially toward the right in FIG. 15. The relatively lighter Belleville springs 173, however, are also in compression and are constantly exerting a leftward force against the screw, and attached power drawbolt via the thrust bearing 179 and flange 181. The force of the light Belleville springs 173 is sufficient to resist immediate axial translation to the right of the drawbolt upon relief of leftward force on the nut supplied by the fluid pressure behind the piston 140. Thus, the springs 173 provide a reaction force in the screw assembly resulting in drawbolt rotation. The nut 130 will move to the right rotating the drawbolt within the spindle, causing full engagement of the quadrifid threaded portion of the drawbolt and the tool shank, respectively (see FIG. 8). Full engagement or one-eighth turn of the drawbolt is established by end abutting engagement of the nut 130 with the thrust bearing 179.

Engagement of the quadrifid threads is effected in the present instance by right-hand rotation of the drawbolt. It is anticipated, however, that the assembly 120 could be designed to provide left-hand rotation of the drawbolt to afford satisfactory drawbolt engagement. Complete release of pressure against the piston 140 and rightward movement of the nut 130, due to the heavy Belleville springs 171, results in a rightward translation of the entire assembly 120 to the extent permitted by abutment of the tapered tool shank with the spindle socket which tensions the drawbolt 70 to secure the tool within the spindle socket. The condition of the actuating mechanism for the power drawbolt with a tool so held in the spindle is shown in FIG. 12.

It is an added feature of the invention that in order to facilitate tool removal when the operation of the drawbolt mechanism is reversed to release the tool 47 from the spindle, a releasing pressure is applied to the tool to "break" it loose in addition to freeing the same from the grasp of the drawbolt threads. In accomplishing this, hydraulic pressure when applied through the port 144 to the rear of the piston 140, moves the piston rapidly to the left as seen in FIG. 12, and against the push rods 147. The push rods in turn produce movement of the nut 130 axially via its flange 151, to compress the heavy Belleville spring assembly 167 to first release tension on the drawbolt. With tension in the drawbolt released, continued movement of the piston to the left will produce rotation of the screw 122, which continues until the nut engages flange 190 on the screw. At that time the drawbolt and tool threads are disengaged, thereby permitting withdrawal of the tool.

Normally the tapered surfaces joining the tool and spindle will separate under pressure of spring assembly 173. However, if separation does not so occur, then the final movement of piston 140 to the left will produce an axial force against the tool to insure such separation. This force is transmitted through rods 147, nut 130, flange 190, drawbolt 70 and shoulder 79 to the tool. The tool, therefore, is free to be handled by the tool changer when the spindle is retracted, and the drawbolt mechanism is again in condition for receipt and tensioning of another tool.

I claim as my invention:

1. For use in a machine for securing and releasing a tool, a power drawbolt comprising cooperating male and female elements on said machine and on said tool, said male element having a peripherally segmented threaded portion, said female element being formed with a complementary segmented threaded socket adapted to initially receive said male element with each threaded male element segment positioned between threaded segments in said socket, and actuating means for selectively rotating said elements relative to each other in one direction so as to engage the threads on said male element segments with the threads on segments in said socket and thereby connect said tool, or in the opposite direction so as to disengage said threads and thereby release said tool.

2. For use in a machine for securing and releasing a tool, a power drawbolt comprising cooperating male and female elements on said machine and on said tool, said male element being threaded and having longitudinal grooves providing a peripheral segmented threaded portion, said female element being formed by a threaded socket having longitudinal grooves along the walls of said socket and arranged in complementary fashion to the grooves in said male element so that said female element is initially adapted to receive said male element with each threaded male element segment positioned in one of said grooves in said socket, and actuating means for selectively rotating said elements relative to each other in one direction so as to engage the threads on said male element segments with the threads in said socket to thereby secure said tool, or in the opposite direction to disengage said threads and thereby release said tool.

3. In a machine tool having a rotatable spindle adapted to support a tool at one end thereof, said tool having a shank portion adapted to be received in said spindle; a drawbolt adapted to secure said tool in said spindle, comprising an elongated male element having a quadrifid threaded portion and a female element formed by a complementary quadrifid threaded socket in said tool; and means for actuating said drawbolt including means for rotating and reciprocating said male element comprising, an antifriction screw and nut assembly having the screw drivingly connected with said male element, resilient means engageable with the nut for biasing the same axially with respect to said screw so as to rotate said screw one-eighth turn and accordingly said male element to engage the threaded segments on said male member with the threads in said socket, and thereafter tension the same, and hydraulically operated means acting in opposition to said resilient means and operable to sequentially overcome said bias to rotate said male element through one-eighth turn to disengage the threads in said socket, and advance said male element to bump said tool and free the same from said spindle.

4. In a machine tool having a rotatable spindle adapted to support a tool at one end thereof, said tool having a shank portion adapted to be received in said spindle; a drawbolt adapted to secure said tool in said spindle, comprising an elongated male element having a quadrifid threaded portion and a female element formed by a complementary quadrifid threaded socket in said tool; and means for actuating said drawbolt comprising an antifriction screw and nut assembly having the screw drivingly connected with said male element, resilient means engageable with the nut for biasing the same axially with respect to said screw so as to rotate said screw one-eighth turn and accordingly said male element to engage the threaded segments on said male member with the threads in said socket, and hydraulically operated means for overcoming said bias to rotate said male element to disengage the threads in said socket and thereby release said tool.

5. In combination, a tool having a shank portion adapted to be received in a rotatable spindle of a machine tool, and means for securing said tool in said spindle comprising an elongated drawbolt longitudinally disposed in said spindle, said drawbolt including a male element having a peripherallly segmented threaded portion at one end thereof, means defining a complementary segmented threaded socket in the shank of said tool, means on said machine tool for aligning said tool shank and drawbolt so as to permit insertion of said drawbolt in said socket with the threaded segments thereof between the segments in said socket, and an actuator connected to said drawbolt for rotating said male element to engage the respective threaded segments of said socket and said male element and for axially tensioning said male element for holding said tool in said spindle.

6. For use with a drawbolt mechanism for securing a work tool in a machine, said work tool having a threaded socket, the improvement comprising an elongated threaded male member longitudinally cleft to form threaded segments, and adapted to cooperate with the threaded socket of a tool to secure such tool in said machine.

7. For use with a drawbolt mechanism for securing a work tool in a machine, said work tool having a threaded socket with the threaded wall of said socket being longitudinally cleft to form threaded segments, the improvement comprising an elongated threaded male member longitudinally cleft in a complementary fashion to said socket to form threaded segments, and adapted to secure such tool in said machine upon relative axial motion to insert said male member in the socket of a tool followed by relative rotational motion to engage said threaded segments thereon with said threaded segments in said socket.

8. For use with a drawbolt mechanism including an elongated threaded male member longitudinally cleft to form threaded segments, the improvement comprising a female drawbolt member having a threaded socket, the threaded wall of said socket being longitudinally cleft to receive the threaded segments on said male member upon axial insertion thereof, the threads on said socket being adapted to be thereafter engaged upon relative rotation of said members.

9. A drawbolt mechanism for securing a work tool in a machine, said drawbolt mechanism comprising an elongated threaded male member longitudinally cleft to form threaded segments, a female member having a threaded socket for receiving said male member, the threaded wall of said socket being longitudinally cleft to receive the threaded segments on said male member upon insertion of the latter in said socket, and a power actuator for providing sequential relative rotational motion and axial tensioning of said members to secure said tool.

10. A drawbolt for securing a work tool in a machine, said drawbolt comprising an elongated threaded male member longitudinally cleft to form threaded segments, and a female member having a threaded socket for receiving said male member, the threaded wall of said socket being longitudinally cleft in a complementary fashion to said male member to form threaded segments, said drawbolt being constructed to secure said tool upon sequential relative axial and rotational motion of said members.

11. A drawbolt mechanism for securing a work tool in a machine, said drawbolt mechanism comprising an elongated threaded male member longitudinally cleft to form threaded segments, and a female member having a threaded socket for receiving said male member, the threaded wall of said socket being longitudinally cleft in a complementary fashion to receive the threaded segments on said male member upon axial insertion of the latter in said socket, said threaded segments being thereafter engageable upon relative rotational motion of said members to secure said tool.

12. A drawbolt mechanism for securing a work tool in a machine, said drawbolt mechanism comprising an elongated threaded male member longitudinally cleft to form threaded segments, a female member having a threaded socket for receiving said male member, the threaded wall of said socket being longitudinally cleft to receive the threaded segments on said male member upon axial insertion of the latter in said socket, and a power actuator for said members, comprising antifriction nut and screw elements one of which is connected with one of said members, and power means operative with the other of said elements for translating said elements relatively in both directions so as to rotate said members relative to one another via the motion converting action of said nut and screw elements to engage or disengage the threaded segments on the respective members.

13. A drawbolt mechanism for securing a work tool in a machine, said drawbolt mechanism comprising an elongated threaded male member longitudinally cleft to form threaded segments, a female member having a threaded socket for receiving said male member, the threaded wall of said socket being longitudinally cleft to receive the threaded segments on said male member upon insertion of the latter in said socket, and a power actuator for said members, comprising antifriction nut and screw elements one of which is connected with one of said members, and a pressure fluid operated piston operative with the other of said elements in conjunction with resilient springs for translating said elements relatively so as to rotate said members relative to one another via the motion converting action of said nut and screw elements to engage the threaded segments on the respective members and thereafter tension said members to draw said tool into engagement with said machine.

14. A drawbolt mechanism for securing a work tool in a machine, said drawbolt mechanism comprising an elongated threaded male member longitudinally cleft to form threaded segments, a female member having a threaded socket for receiving said male member, the threaded wall of said socket being longitudinally cleft to receive the threaded segments on said male member upon axial insertion of the latter in said socket, and a power actuator for said members, comprising antifriction nut and screw elements one of which is connected with one of said members, and a pressure fluid operated piston operative with the other of said elements in conjunction with resilient springs for translating said elements relatively in both directions so that in sequence (1) said members rotate relative to one another via the motion converting action of said nut and screw elements to engage or disengage the threaded segments on the respective members (2) said members are tensioned to draw said tool into engagement with said machine or are forced apart to eject said tool.

15. A drawbolt mechanism for securing a work tool in a machine, said drawbolt mechanism comprising an elongated threaded male member longitudinally cleft to form a plurality of threaded segments, a female member having a threaded socket for receiving said male member, the threaded wall of said socket being cleft in a complementary fashion to receive the threaded segments on said male member upon axial insertion of the latter in said socket, and actuator means for seqeuntial axial insertion of said male member into said socket, followed by relative rotation of said members to engage said threaded segments within said socket, followed by axial tensioning of said members to secure said tool.

References Cited by the Examiner

UNITED STATES PATENTS

| | | | |
|---|---|---|---|
| 1,565,070 | 12/1925 | Edwards | 287—125 |
| 1,671,458 | 5/1928 | Wilson | 287—125 X |
| 2,441,046 | 5/1948 | Turrettini. | |
| 2,713,811 | 7/1955 | Stephan. | |
| 2,924,152 | 2/1960 | Zettler. | |
| 2,994,250 | 8/1961 | Walter et al. | |
| 3,023,675 | 3/1962 | Stephan. | |
| 3,118,345 | 1/1964 | Bullar et al. | |

WILLIAM W. DYER, JR., *Primary Examiner.*